US012543156B2

(12) United States Patent
Oguma et al.

(10) Patent No.: US 12,543,156 B2
(45) Date of Patent: Feb. 3, 2026

(54) TERMINAL, COMMUNICATION METHOD, AND BASE STATION

(71) Applicant: NTT DOCOMO, INC., Tokyo (JP)

(72) Inventors: Yuta Oguma, Tokyo (JP); Ryu Kitagawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 322 days.

(21) Appl. No.: 18/257,393

(22) PCT Filed: Jan. 14, 2021

(86) PCT No.: PCT/JP2021/001136
§ 371 (c)(1),
(2) Date: Jun. 14, 2023

(87) PCT Pub. No.: WO2022/153466
PCT Pub. Date: Jul. 21, 2022

(65) Prior Publication Data
US 2024/0015708 A1  Jan. 11, 2024

(51) Int. Cl.
*H04W 72/0446* (2023.01)
*H04W 72/0453* (2023.01)
*H04W 72/51* (2023.01)

(52) U.S. Cl.
CPC ... *H04W 72/0446* (2013.01); *H04W 72/0453* (2013.01); *H04W 72/51* (2023.01)

(58) Field of Classification Search
None
See application file for complete search history.

(56) References Cited

U.S. PATENT DOCUMENTS

2016/0295430 A1* 10/2016 Jung ..................... H04L 5/0053
2019/0222326 A1*  7/2019 Dunworth ............. H04B 17/13
2019/0394834 A1* 12/2019 Cui ....................... H04W 24/10
2020/0029345 A1*  1/2020 Malik ................... H04L 27/364

FOREIGN PATENT DOCUMENTS

JP    2016-535511 A    11/2016

OTHER PUBLICATIONS

Nokia et al.; "Revised WID Further enhancements of NR RF requirements for frequency range 2 (FR2)"; 3GPP TSG RAN meeting #90e, RP-202409; Electronic Meeting, Dec. 7-11, 2020 (5 pages).

(Continued)

*Primary Examiner* — Srinivasa R Reddivalam
(74) *Attorney, Agent, or Firm* — Osha Bergman Watanabe & Burton

(57) ABSTRACT

A terminal includes a receiving unit that receives configuration information for configuring a time and frequency domain in which a transmission is stopped; a transmitting unit that transmits terminal capability information indicating that the terminal is capable of performing calibration by stopping the transmission in the time and frequency domain; and a control unit that performs the calibration by stopping the transmission in the time and frequency domain based on the configuration in a case where the receiving unit receives the configuration information and the transmitting unit transmits the terminal capability information.

5 Claims, 9 Drawing Sheets

(56) References Cited

OTHER PUBLICATIONS

Apple et al.; "WF on FR2 enhancement part 3: UL gap"; 3GPP TSG-RAN WG4#97-e Meeting, R4-2016919; Electronic Meeting; Nov. 2-13, 2020 (6 pages).
International Search Report issued in PCT/JP2021/001136 on Aug. 24, 2021 (5 pages).
Written Opinion of the International Searching Authority issued in PCT/JP2021/001136 on Aug. 24, 2021 (3 pages).
Office Action issued in Japanese Application No. 2022-574975, dated Sep. 3, 2024 (4 pages).

\* cited by examiner

TERMINAL, COMMUNICATION METHOD, AND BASE STATION

TECHNICAL FIELD

The present invention relates to a terminal, a communication method, and a base station in a radio communication system.

BACKGROUND ART

In the 3rd Generation Partnership Project (3GPP), a study on a radio communication system referred to as 5G or New Radio (NR) (in the following, the radio communication system is referred to as "NR") has been advanced, in order to achieve a further increase in system capacity, a further increase in a data transmission rate, a further reduction of latency in a radio section, and the like. In 5G, in order to meet the requirements that, while achieving a throughput of greater than or equal to 10 Gbps, latency in the radio section is reduced to be less than or equal to 1 ms, various radio technologies and various types of network architecture have been studied.

In the 3rd Generation Partnership Project (3GPP) Release 17 New Radio (NR), "UL gaps for self-calibration and monitoring" have been discussed, which are for a user equipment (UE) to perform calibration inside the UE (Non-Patent Document 1). It is expected that, by the calibration inside the UE, improvement of power efficiency of the UE and optimization of the transmission system of the UE with respect to a temperature variation are achieved, and the transmission and reception capability of the UE is dynamically improved (Non-Patent Document 2).

CITATION LIST

Non Patent Literature

[NPL 1] 3GPP TSG RAN meeting #90e, RP-202409, Electronic Meeting, Dec. 7-11, 2020
[NPL 2] 3GPP TSG-RAN WG4 #97-e Meeting, R4-2016919, Electronic Meeting, R4-2016919, 2-13 Nov. 2020

SUMMARY OF INVENTION

Technical Problem

For configuring an uplink gap (UL gap, which may be a time and frequency domain for stopping an uplink transmission) for calibration inside the UE, for example, a case is considered in which, even if the UE requests scheduling for configuring the UL gap, the network is unable to respond to it, such as a case where the network does not support configuration of the UL gap.

For a UL gap configuration, there is a need for clarifying a condition under which the UL gap is to be configured.

Solution to Problem

According to the disclosed technology, there is provided a terminal including a receiving unit that receives configuration information for configuring a time and frequency domain in which a transmission is stopped; a transmitting unit that transmits terminal capability information indicating that the terminal is capable of performing calibration by stopping the transmission in the time and frequency domain; and a control unit that performs the calibration by stopping the transmission in the time and frequency domain based on the configuration in a case where the receiving unit receives the configuration information and the transmitting unit transmits the terminal capability information.

Advantageous Effects of Invention

According to the disclosed technology, a condition under which a UL gap is to be configured is clarified.

DESCRIPTION OF EMBODIMENTS

In the following, embodiments of the present invention are described with reference to the drawings. Note that, the embodiments described below are examples, and embodiments to which the present invention is applied are not limited to the following embodiments.

In operating a radio communication system according to an embodiment of the present invention, existing technology may be used as appropriate. The existing technology is, for example, an existing New Radio (NR) or Long Term Evolution (LTE), but is not limited to an existing NR or LTE.
(System Configuration)

Figure 1:
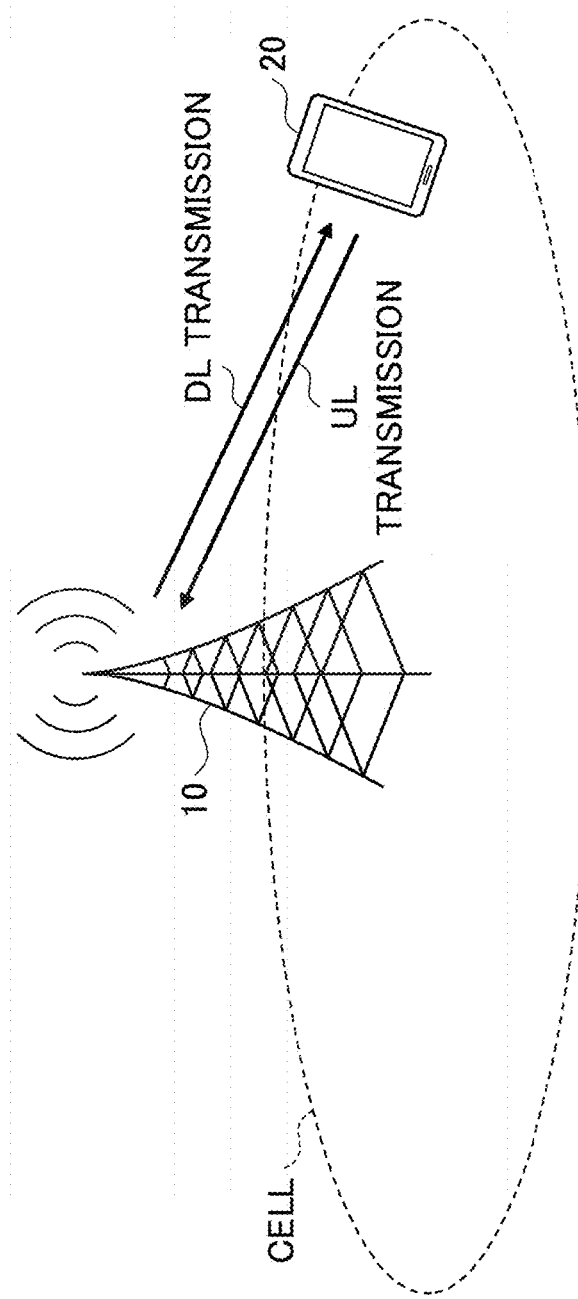
FIG. 1 is a diagram for illustrating a radio communication system according to an embodiment.

FIG. 1 is a diagram illustrating a radio communication system according to an embodiment of the present invention. The radio communication system according to an embodiment of the present invention includes a base station 10 and a terminal 20, as illustrated in FIG. 1. In FIG. 1, one base station 10 and one terminal 20 are illustrated. However, this is an example, and there may be a plurality of base stations 10 and a plurality of terminals 20.

The base station 10 is a communication device that provides one or more cells and performs radio communication with the terminal 20. A physical resource of a radio signal is defined in a time domain and a frequency domain, the time domain may be defined by a number of OFDM symbols, and the frequency domain may be defined by a number of sub-carriers or a number of resource blocks. A Transmission Time Interval (TTI) in the time domain may be a slot, or the TTI may be a subframe.

The base station 10 can perform carrier aggregation in which communication is performed with the terminal 20 by bundling a plurality of cells (a plurality of component carriers (CCs)). For carrier aggregation, one primary cell (PCell) and one or more secondary cells (SCells) are used.

The base station 10 transmits synchronization signals, system information, and the like to the terminal 20. The synchronization signals are, for example, NR-Primary Synchronization Signal (PSS) and NR-Secondary Synchronization Signal (SSS). System information is transmitted, for example, on NR-Physical Broadcast Channel (PBCH) or Physical Downlink Shared Channel (PDSCH), and is also called broadcast information. As illustrated in FIG. 1, the base station 10 transmits a control signal or data to the terminal 20 via Downlink (DL) and receives a control signal or data from the terminal 20 via Uplink (UL). Here, a signal transmitted on a control channel, such as a Physical Uplink Control Channel (PUCCH) or a Physical Downlink Control Channel (PDCCH), is referred to as a control signal, and a signal transmitted on a shared channel, such as a Physical Uplink Shared Channel (PUSCH) or a Physical Downlink Shared Channel (PDSCH), is referred to as data. However, such names are examples.

The terminal 20 is a communication device provided with a radio communication function, such as a smartphone, a cellular phone, a tablet, a wearable terminal, or a communication module for Machine-to-Machine (M2M). As illustrated in FIG. 1, the terminal 20 utilizes various types of communication services provided by a radio communication system by receiving control signals or data via DL from the base station 10 and transmitting control signals or data via UL to the base station 10. The terminal 20 may be referred to as a User Equipment (UE), and the base station 10 may be referred to as a gNodeB (gNB).

The terminal 20 can perform carrier aggregation in which communication is performed with the base station 10 by bundling a plurality of cells (a plurality of component carriers (CCs)). For the carrier aggregation, one primary cell (PCell) and one or more secondary cells (SCells) are used. A PUCCH-SCell having a PUCCH may also be used.

Figure 2:
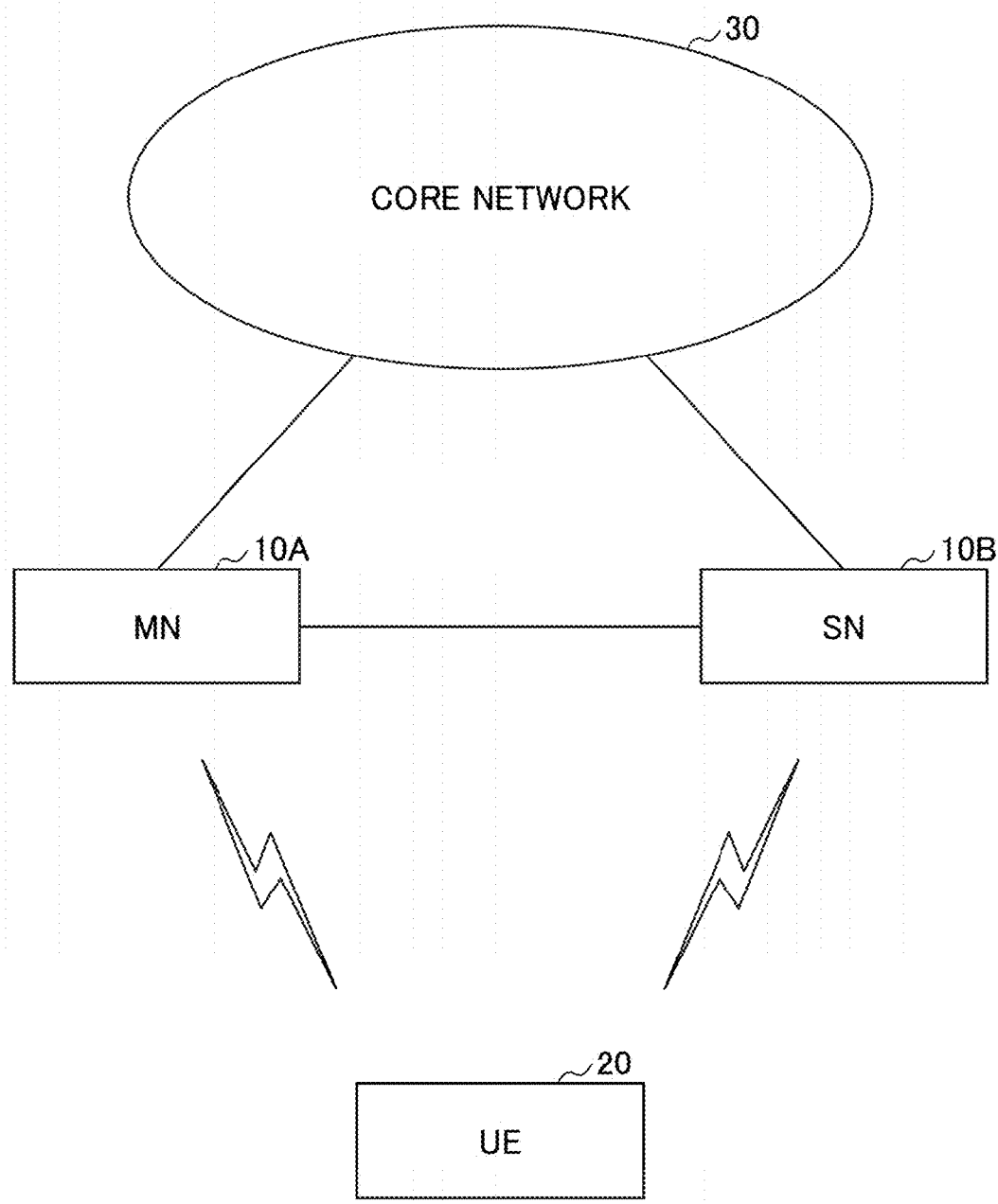
FIG. 2 is a diagram for illustrating a radio communication system according to an embodiment.

FIG. 2 illustrates an example of a configuration of a radio communication system in a case in which Dual connectivity (DC) is executed. As illustrated in FIG. 2, a base station 10A serving as a Master Node (MN) and a base station 10B serving as a Secondary Node (SN) are provided. Each of the base station 10A and the base station 10B is connected to a core network. The terminal 20 can communicate with both the base station 10A and base station 10B.

A cell group provided by the base station 10A that is an MN is called a Master Cell Group (MCG), and a cell group provided by the base station 10B that is an SN is called a Secondary Cell Group (SCG). Furthermore, in DC, an MCG includes one PCell and one or more SCells, and an SCG includes one Primary SCell (PSCell) and one or more SCells.

The processing operation according to the embodiments may be performed in the system configuration illustrated in FIG. 1, in the system configuration illustrated in FIG. 2, or may be performed in another system configuration.

(Basic Operation Example)

Figure 3:
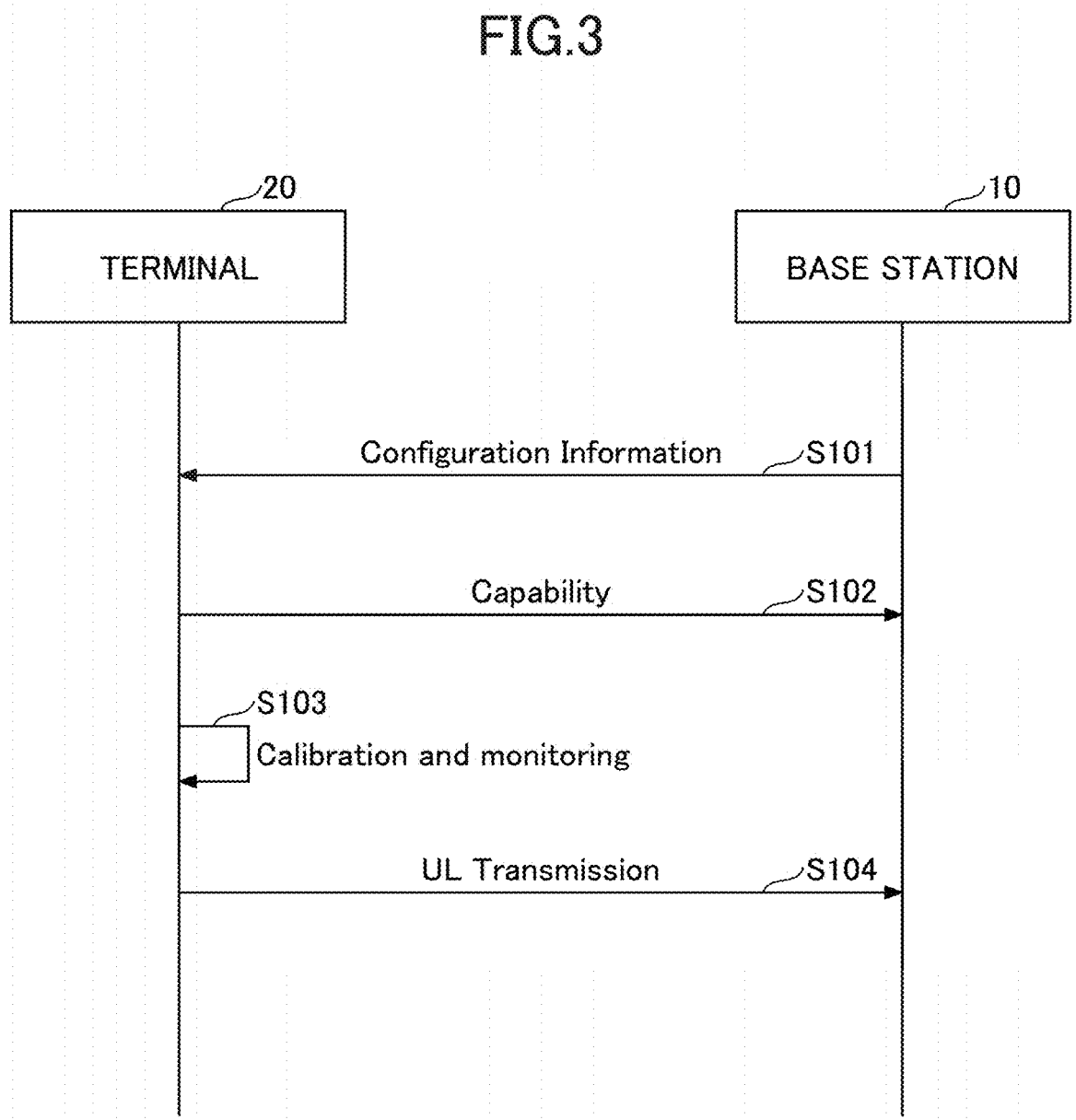
FIG. 3 is a diagram for illustrating a basic operation of a radio communication system according to an embodiment.

Referring to FIG. 3, a basic operation example of a communication system according to an embodiment of the present invention is described. This operation is basically a common operation among the embodiments.

At S101, that base station 10 transmits, to the terminal 20, configuration information of a time and frequency domain to stop an uplink transmission (which may be referred to as a UL gap), which is for the terminal 20 to perform calibration or the like of a power amplifier or the like inside the terminal 20, and the terminal 20 receives the configuration information.

At S102, the terminal 20 transmits, to the base station 10, terminal capability information indicating capability of the terminal 20 of performing self-calibration and monitoring by stopping the uplink transmission in the time and frequency domain indicated by the configuration information. At S103, the terminal 20 configures the time and frequency domain (UL gap) to stop the uplink transmission based on the configuration information received at S101, and performs calibration, monitoring, or the like of the power amplifier or the like inside the terminal 20 in the configured UL gap. Subsequently, at S104, the terminal 20 performs a UL transmission while applying calibrated transmission power or the like.

In the 3GPP Release 17 RAN 4 meeting, the "UL gaps for self-calibration and monitoring" have been discussed. A frequency band used for 3GPP NR includes a Frequency Range 1 (FR1) including a frequency that is lower than the 6 GHz band and a Frequency Range 2 (FR2) that is a frequency band higher than the FR1. The FR2 includes a millimeter wave band from 24.25 GHz to 52.6 GHz. The "UL gaps for self-calibration and monitoring" have been one of the study items of RF of the UE in FR2 in the Release 17.

More specifically, a method of dynamically improving UE capability has been studied such that, by configuring a UL gap in which an uplink transmission from the terminal 20 is stopped, calibration of the power amplifier or the like inside the terminal 20 is performed in the UL gap so that improvement of power efficiency and optimization of the transmission system with respect to a temperature variation can be achieved.

A discussion of a related work item (WI) has been started from the 3GPP RAN4 #97-e meeting. A direction of the future discussions has been decided, and conditions on transmission that can be candidates for UE capability to be improved by the introduction of the UL gap have been listed.

Specifically, the following improvements are expected: to extend coverage by increasing UL transmission output; to reduce the maximum power reduction (MPR) tolerance and extend coverage for the high Modulation and Coding Scheme (MCS); to improve signal quality by improving Error Vector Magnitude (EVM, error vector magnitude), IQ imbalance, Carrier leakage, or the like; to improve transmission characteristics by reducing adjacent channel interface and in-band emission; to enhance accuracy of transmission power control, or the like. In the 3GPP meeting, it has been assumed that the terminal 20 configures a UL gap and performs self-calibration and monitoring in the RF2. However, the embodiments are not limited to the case of FR2, and the terminal 20 may configure a UL gap and perform self-calibration and monitoring in a frequency band other than FR2, such as FR1.

In the 3GPP meeting, as the type of the UL gap, two types (Type1 and Type 2) have been considered.

Type 1 is a UL gap configured for the terminal 20 such that, during the gap, scheduling for an uplink transmission is not required. Namely, in the case of Type 1, it is assumed that there is no transmission and/or reception by the terminal 20 for the self-calibration and monitoring of the terminal 20. Accordingly, in the case of Type 1, the base station 10 may assign a resource corresponding to the UL gap to a transmission and/or a reception by another terminal 20.

Type 2 is a UL gap configured for the terminal 20 such that, during the gap, scheduling for an uplink transmission is required including a dedicated time and frequency resource for self-calibration and monitoring of the terminal 20. Namely, in the case of Type 2, it is assumed that there is a transmission and/or a reception by the terminal 20 for the self-calibration and monitoring of the terminal 20. Accordingly, in the case of Type 2, it is assumed that the base station 10 does not assign a resource corresponding to the UL gap to a transmission and/or a reception by another terminal 20.

Figure 4:
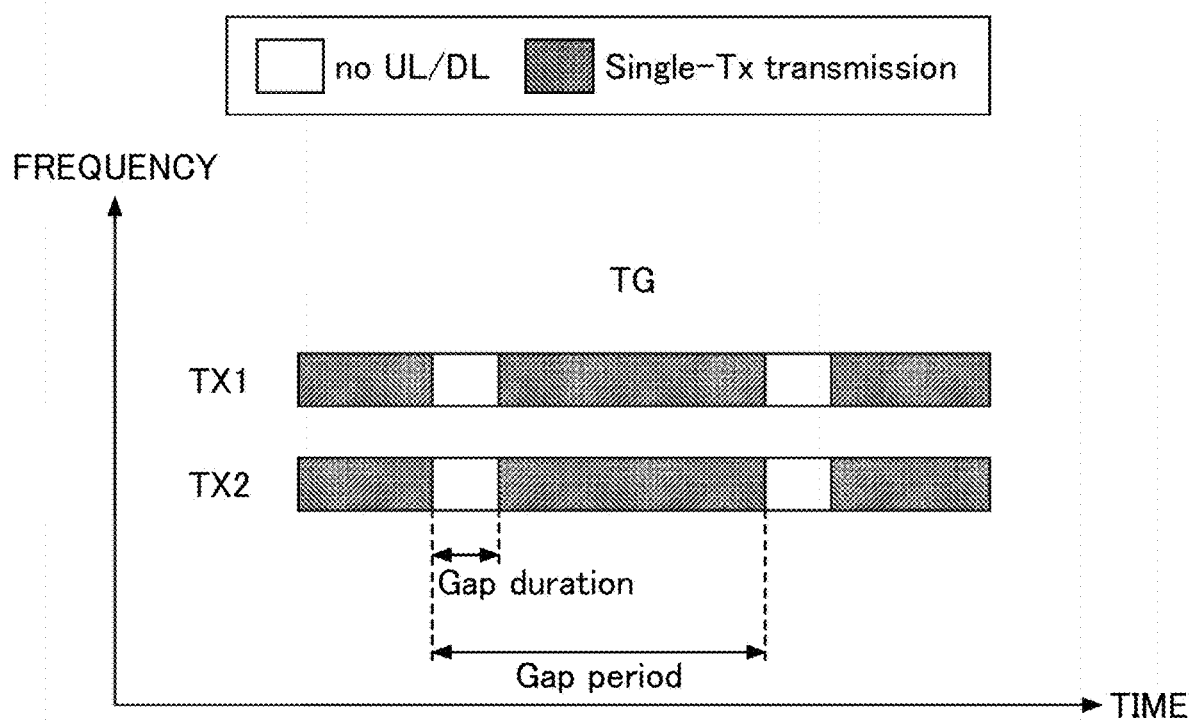
FIG. 4 is a diagram illustrating an example of a Type 1 UL gap.

FIG. 4 is a diagram illustrating an example of a Type 1 UL gap. In the example of FIG. 4, the terminal 20 is provided with two transmission systems, which are TX1 and TX2, and the terminal 20 performs a first transmission from one of the two transmission systems (TX1) and performs a second transmission from the other of the two transmission systems (TX2). In the example of FIG. 4, the frequency bands used by TX1 and TX2 differ. However, the frequency bands used by TX1 and TX2 are not limited to this example. For example, the frequency bands may partially overlap, or the frequency bands may be the same frequency band (in this case, a beam used by TX1 may differ from a beam used by TX2). During the gap duration illustrated in FIG. 4, the terminal 20 may perform self-calibration and monitoring of the terminal 20 by stopping both TX1 and TX2. In this case, the base station 10 may assign the time and frequency resource corresponding to the gap duration to a transmission and/or a reception by another terminal 20. Note that, in FIG. 4, TG means a total gap. In the example of FIG. 4, the terminal 20 is provided with the two transmission systems, which are TX1 and TX2. However, the embodiments are not limited to this example. For example, the terminal 20 may be provided with only one transmission system, or the terminal 20 may be provided with three or more transmission systems.

Figure 5:
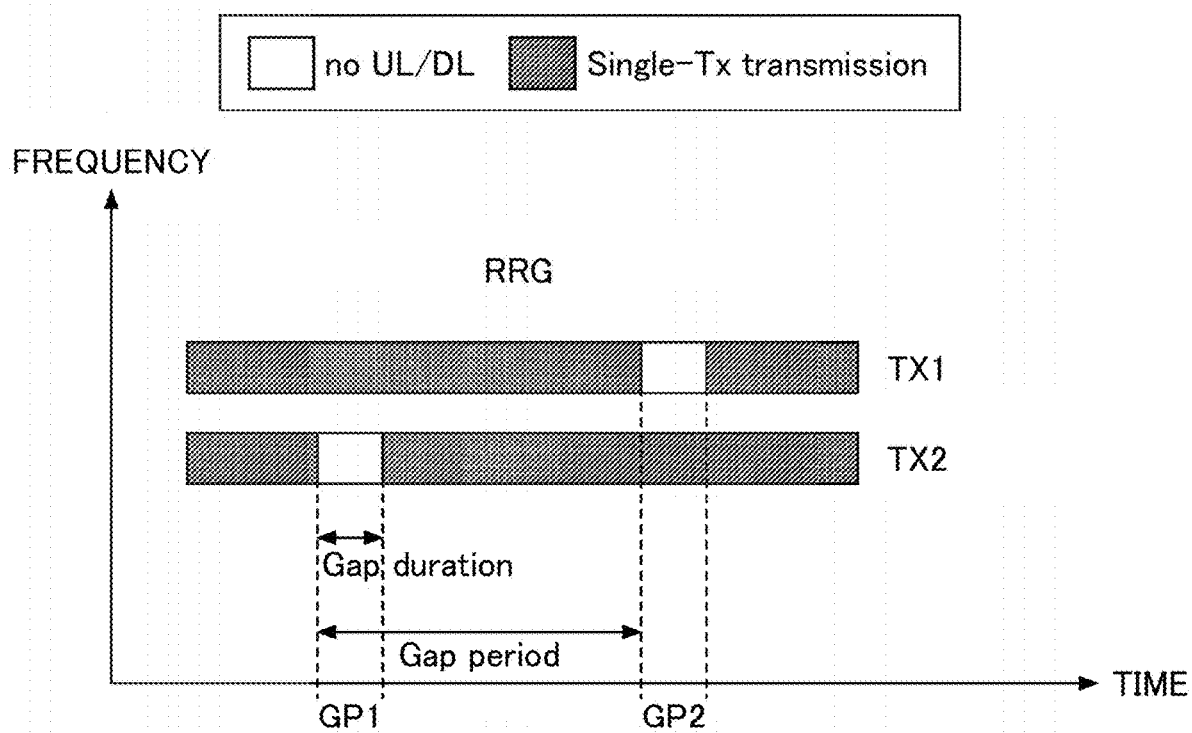
FIG. 5 is a diagram illustrating an example of a Type 2 UL gap.

FIG. 5 is a diagram illustrating an example of a Type 2 UL gap. In the example of FIG. 5, the terminal 20 is provided with two transmission systems, which are TX1 and TX2, and the terminal 20 performs a first transmission from one of the two transmission systems (TX1) and performs a second transmission from the other of the two transmission systems (TX2). In the example of FIG. 5, the frequency bands used by TX1 and TX2 differ. However, the frequency bands used by TX1 and TX2 are not limited to this example. For example, the frequency bands may partially overlap, or the frequency bands may be the same frequency band (in this case, a beam used by TX1 may differ from a beam used by TX2). In the example of FIG. 5, in the gap duration indicated by GP1, TX1 performs a transmission and TX2 stops transmitting. During the gap duration indicated by GP1, the terminal 20 may perform self-calibration and monitoring of TX2. In the gap duration indicated by GP2, TX2 performs a transmission and TX1 stops transmitting. During the gap duration indicated by GP2, the terminal 20 may perform self-calibration and monitoring of TX1. In the example illustrated in FIG. 5, for example, in a case where the frequency band used by TX1 and TX2 are the same (the beam used by TX1 may differ from the beam used by TX2), the base station 10 may avoid assigning the time and frequency resource corresponding to the gap duration to a transmission and/or a reception by another terminal 20. Note that, in FIG. 5, RRG means rank restricted gap. In the example of FIG. 5, the terminal 20 is provided with the two transmission systems, which are TX1 and TX2. However, the embodiments are not limited to this example. For example, the terminal 20 may be provided with only one transmission system, or the terminal 20 may be provided with three or more transmission systems.

In the 3GPP meeting, it is assumed that the items to be evaluated as the improved capability of the terminal 20 are the conditions that can be tested, i.e., the conditions on transmission that have already specified in the technical specifications up to those of 3GPP Release 16. Furthermore, it is assumed that, as an effect on a network caused by the introduction of the UL gap, restriction of scheduling, a UL overhead, interference power, and the like are to be studied.

(Problem 1)

In the example illustrated in FIG. 5, the base station 10 performs special scheduling to configure the UL gap. Specifically, scheduling is required such that, for the two transmission systems of the terminal 20, transmission is performed only at one of the two transmission systems and transmission is not performed at the other of the two transmission systems. However, it is likely that the base station 10 does not support performing such special scheduling. In a case where the terminal 20 supporting the UL gap configuration resides in an area of the base station 10 that does not support the UL gap configuration, even if the terminal 20 requests scheduling for the UL gap configuration, the base station 10 that does not support the configuration is unable to respond to the request. Accordingly, it is likely that the terminal 20 performs an unnecessary request.

(Problem 2)

It is likely that introduction of the UL gap causes some effects on the base station 10 and the radio communication system, such as restriction on scheduling, an increase in a UL overhead (e.g., the length of the gap in the time direction and the periodicity in the time direction), and UL interference during the performing of calibration of the power amplifier. Depending on the extent of the effect, it is not necessarily preferable to configure a UL gap so as to cause the terminal 20 to perform self-calibration and monitoring. For example, in the case of the example of FIG. 5, by introducing the UL gap, the scheduling of the base station 10 is restricted, the time period during which the terminal 20 is unable to perform a UL transmission increases, and the self-calibration by one of the transmission systems of the terminal 20 may interfere with the other of the transmission systems. Furthermore, for example, the required cell coverage may be relatively small, such as an indoor space, and, thus, it is likely that UL capability improvement of the terminal 20 is not required. Taking into account the possible effects caused by the introduction of the UL gap, such as an increase in the effect of the interference on the terminal 20 and the restriction on the scheduling, if a UL gap is introduced in an area where the UL capability improvement is not required, it is likely that the utilization efficiency of the radio communication system is lowered.

(Problem 3)

In a case where a UL gap is configured so as to cause the terminal 20 to perform self-calibration and monitoring, if the base station 10 (or the network) is unable to determine details of the transmission conditions that are to be improved as the result (transmission characteristics by the terminal 20, e.g., transmission power), it may be difficult to improve efficiency of the radio communication system. For example, depending on an object to be calibrated within the terminal 20, the transmission conditions to be improved may differ for each terminal 20. In addition, an amount of improvement in the transmission condition to be improved may differ for each terminal 20. In addition, an amount of improvement in the transmission condition to be improved may differ in time depending on the state of the terminal 20 (e.g., the temperature of the terminal 20). In addition, an amount of improvement in the transmission condition to be improved may be limited to a portion of a time interval. If information on an amount of improvement is unclear, it is likely that the base station 10 (or the network) is unable to reflect the capability improvement by the UL gap upon improvement of capability of the radio communication system.
(Solution A)

For example, as a solution to the above-described Problem 1 and Problem 2, the fact that both (1) signaling of an Information Element (IE) from the base station 10 to the terminal 20 and (2) signaling of terminal capability (which may be referred to as UE Capability) from the terminal 20 to the base station 10 are performed may be defined as a necessary condition to start the operation of configuring the UL gap and causing the terminal 20 to perform self-calibration and monitoring.

If the signaling of the Information Element (IE) from the base station 10 to the terminal 20 is a necessary condition to start the operation of configuring the UL gap and causing the terminal 20 to perform self-calibration and monitoring, the base station 10 that is incapable of signaling the IE, i.e., the base station 10 that does not support the UL gap configuration does not start the operation of configuring the UL gap and causing the terminal 20 to perform self-calibration and monitoring. Accordingly, the above-described Problem 1 can be solved.

Furthermore, if the signaling of the Information Element (IE) from the base station 10 to the terminal 20 is a necessary condition to start the operation of configuring the UL gap and causing the terminal 20 to perform self-calibration and monitoring, in a specific area where the UL capability improvement is not required, if the base station 10 does not configure the IE, the base station 10 does not start the operation of configuring the UL gap and causing the terminal to perform self-calibration and monitoring. Accordingly, the above-described Problem 2 can be solved.
(Solution B)

In a case where the UL gap is to be configured and the terminal 20 is to be caused to perform self-calibration and monitoring, information indicating a type of a transmission condition to be improved by the self-calibration and monitoring (characteristics of a transmission by the terminal 20, e.g., transmission power), a value of an amount of the improvement, a time period of the improvement, or the like may be transmitted (signaled) from the terminal 20 to the base station 10. Note that the item to be improved by self-calibration and monitoring by the terminal 20 is not limited to the transmission conditions (characteristics of a transmission by the terminal 20), and reception conditions (characteristics of a reception by the terminal 20) may be improved.

By transmitting, from the terminal 20 to the base station 10, the information indicating a type of a transmission condition to be improved by the self-calibration and monitoring (which may be a type of a reception condition), a value of an amount of the improvement, a time period of the improvement, or the like, the base station 10 can determine the type of the transmission condition to be improved (which may be the type of the reception condition), the value of the amount of the improvement, the time period of the improvement and the like, so that the efficiency of the radio communication system can be improved. Namely, the above-described Problem 3 can be solved.

Note that, as examples of the transmission characteristics (transmission conditions) of the terminal 20 that may be improved by self-calibration and monitoring by the terminal 20, for example, the following condition 1 to condition 5 can be considered.

(Condition 1) transmission power of the terminal 20
(Condition 2) MPR of the terminal 20
(Condition 3) quality of a signal transmitted by the terminal 20
(Condition 4) interference caused by a transmission by the terminal 20
(Condition 5) transmission power control by the terminal 20.

The above-described condition 1 to condition 5 are conditions on the transmission characteristics of the terminal 20. As examples of the reception characteristics (reception conditions) of the terminal 20 that may be improved by self-calibration and monitoring by the terminal 20, the reception characteristics of the terminal 20 corresponding to condition 1 to condition 5 may be considered. Accordingly, the subject matters of condition 1 to condition 5 may be replaced with the corresponding reception characteristics of the terminal 20.

For a transmission condition (and/or a reception condition) that may be improved, the terminal 20 may signal one transmission condition, such as "condition 1." Furthermore, the terminal 20 may signal a plurality of transmission conditions, such as "condition 1 and condition 2." Furthermore, the above-described conditions may be grouped, such as "group A: condition 1, condition 2, and condition 3" and "group B: condition 4 and condition 5." In addition, the terminal 20 may signal a specific group, such as "group A."

For an amount of the improvement of a transmission characteristic (transmission condition) (and/or a reception condition) of the terminal to be improved, the terminal 20 may signal a specific value, such as "3 dB." Furthermore, for example, the above-described amount of the improvement may be classified, such as "class A: 0 dB to 3 dB" and "class B: 3 dB to 6 dB." In addition, the terminal 20 may signal a specific class, such as "class A."

The amount of improvement may also be represented by a relative value with respect to a specified value of the transmission condition (and/or reception condition). Alternatively, the amount of the improvement may be represented by an absolute value with respect to a specified value of the transmission condition (and/or reception condition). When the amount of the improvement is represented by a relative value, instead of the relative value with respect to a specified value of a transmission condition, a relative value with respect to the current capability (e.g., the transmission power of the terminal 20 is 17 dBm) of the terminal 20 may be used.

For a time period of improvement of a transmission characteristic (transmission condition) (and/or a reception condition) of the terminal 20 that may be improved, the terminal 20 may define the time period of the improvement by defining the signaling from the terminal 20 as a start point, or by defining the time specified by the signaling from the terminal 20 as the start point. Alternatively, the terminal 20 may define the time period of improvement by defining scheduling of a UL gap (scheduling for calibration) or the like as the start point. Alternatively, the terminal 20 may signal that the improvement constantly continues, such that, during transmission by the terminal 20, a transmission characteristic (transmission condition) (and/or a reception condition) of the terminal 20 is constantly improved.

Signaling in a case of transmitting, from the terminal 20 to the base station 10, the information indicating a type of a transmission condition (and/or a reception condition) to be improved by the self-calibration and monitoring, a value of an amount of the improvement, a time period of the improvement, or the like may be implemented by a transmission of the terminal capability information (UE Capability), or another signaling (e.g., Medium Access Control Control Element (MAC CE)).

Information indicating all of a type of a transmission condition (and/or a reception condition) to be improved by self-calibration and monitoring, an amount of the improvement, and a time period of the improvement may be transmitted from the terminal 20 to the base station 10, or information indicating a portion of the type of the transmission condition (and/or the reception condition) to be improved by the self-calibration and monitoring, the amount of the improvement, and the time period of the improvement may be transmitted.

In a case of transmitting, from the terminal 20 to the base station 10, the information indicating a type of a transmission condition (and/or a reception condition) to be improved by the self-calibration and monitoring, a value of an amount of the improvement, a time period of the improvement, or the like, signaling of the type of the transmission condition (and/or the reception condition) to be improved, signaling of the value of the amount of the improvement, and signaling of the time period of the improvement may be independently performed.

In a case of transmitting, from the terminal 20 to the base station 10, the information indicating a type of a transmission condition (and/or a reception condition) to be improved by the self-calibration and monitoring, a value of an amount of the improvement, a time period of the improvement, or the like, signaling of the type of the transmission condition (and/or the reception condition) to be improved, signaling of the value of the amount of the improvement, and signaling of the time period of the improvement may be performed while being associated. As an example of the association, the terminal may perform signaling such that the condition X is improved by Y dB in the time period of Z.

Figure 6:
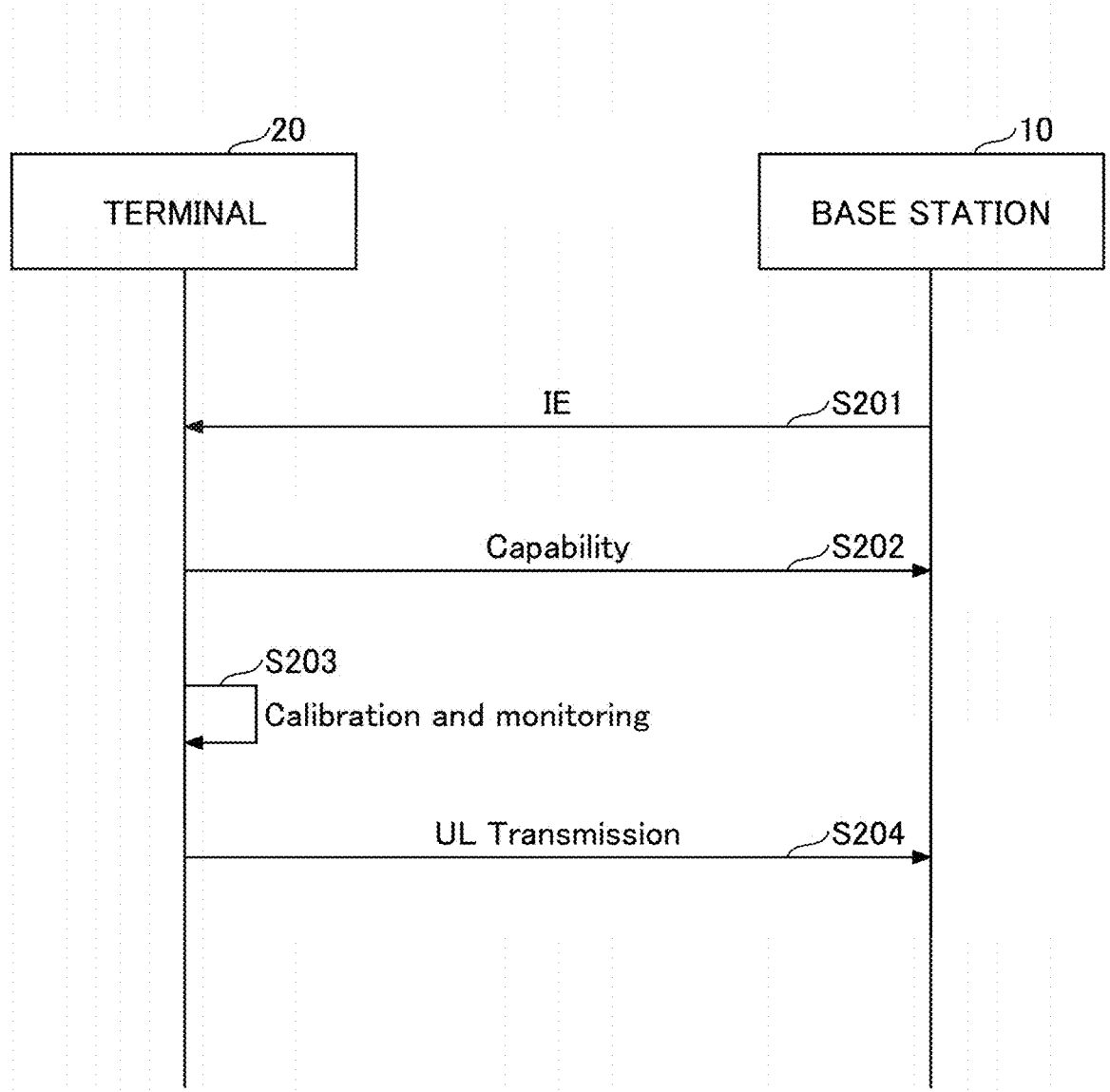
FIG. 6 is a diagram illustrating an example of an operation in a case where a terminal 20 performs self-calibration and monitoring in a Type 1 UL gap.

FIG. 6 is a diagram illustrating an example of an operation in which the terminal 20 performs self-calibration and monitoring in a Type 1 UL gap.

At S201, the base station 10 performs signaling of an Information Element (IE) to the terminal 20. The IE may be an information element indicating that the base station 10 supports the UL gap configuration.

At S202, the terminal 20 includes, in terminal capability information, information indicating a time and frequency domain interval in which the transmission system of the terminal 20 does not perform a transmission and information indicating a type of a transmission condition (and/or a reception condition) to be improved by the self-calibration and monitoring, a value of an amount of the improvement, a time period of the improvement, or the like, and the terminal 20 transmits the terminal capability information to the base station 10.

At step S203, the terminal 20 performs the self-calibration and monitoring in the time domain interval in which the transmission system of the terminal 20 does not perform a transmission, which is indicated to the base station 10 at S202.

At S204, the terminal 20 performs a UL transmission. During the performing of the UL transmission at S204, the transmission characteristic of the terminal 20 may be improved by the calibration. The base station 10 can perform reception while assuming that the characteristic of the UL transmission from the terminal 20 has been improved. Additionally, or alternatively, at S204, the terminal 20 may perform a DL reception. In this case, during the performing of the DL reception at S204, the reception characteristic of the terminal 20 may be improved by the calibration.

Figure 7:
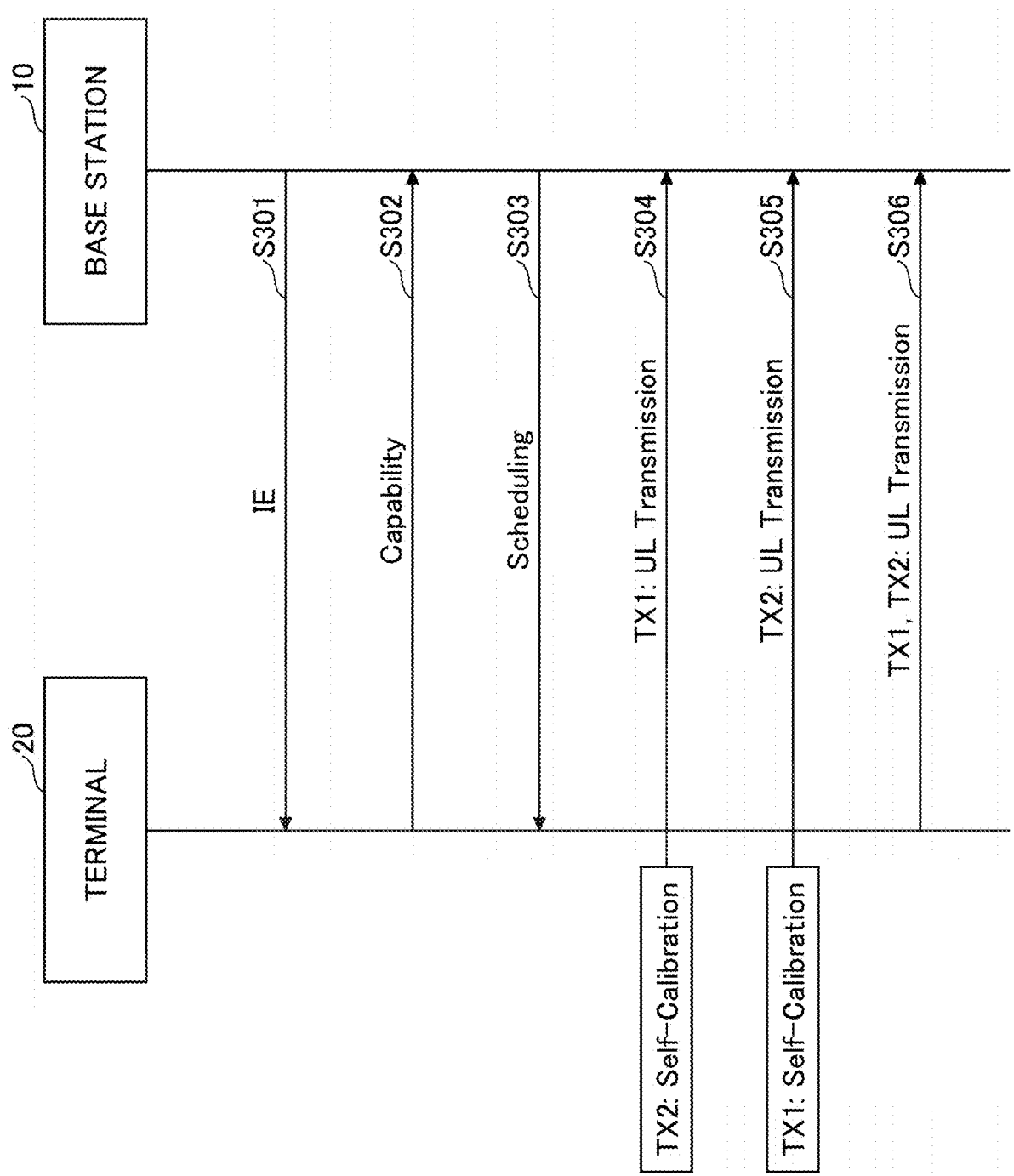
FIG. 7 is a diagram illustrating an example of an operation in a case where the terminal 20 performs self-calibration and monitoring in a Type 2 UL gap.

FIG. 7 is a diagram illustrating an example of an operation in a case where the terminal 20 performs self-calibration and monitoring in a Type 2 UL gap. Note that, in this example, as illustrated in FIG. 5, it is assumed that the terminal 20 is provided with two transmission systems, which are TX1 and TX2. Furthermore, as illustrated in FIG. 5, in the gap duration indicated by GP1, TX1 performs a transmission and TX2 stops transmitting. In the gap duration indicated by GP2, TX2 performs a transmission and TX1 stops transmitting.

At S301, the base station 10 performs signaling of an Information Element (IE) to the terminal 20. The IE may be an information element indicating that the base station 10 supports the UL gap configuration.

At S302, the terminal 20 includes, in terminal capability information, information indicating a type of a transmission condition (and/or a reception condition) to be improved by the self-calibration and monitoring, a value of an amount of the improvement, a time period of the improvement, or the like, and the terminal 20 transmits the terminal capability information to the base station 10.

At S302, the base station 10 performs scheduling so that, in the gap duration indicated in GP1 in FIG. 5, TX1 performs a transmission and TX2 stops transmitting, and, in the gap duration indicated in GP2, TX2 performs a transmission and TX1 stops transmitting.

At S304, the transmitting system TX1 of the terminal 20 performs a UL transmission in the gap duration indicated by GP1 in FIG. 5 in accordance with the scheduling by the base station 10. Furthermore, in S304, the transmitting system TX2 of the terminal 20 stops transmitting in UL in the gap duration indicated by GP1 in FIG. 5 in accordance with the scheduling by the base station 10 and performs self-calibration and monitoring.

At S305, the transmitting system TX2 of the terminal performs a UL transmission in the gap duration indicated by GP2 in FIG. 5 in accordance with the scheduling by the base station 10. Furthermore, at S305, the transmitting system TX1 of the terminal 20 stops transmitting in UL in the gap duration indicated by GP2 in FIG. 5 in accordance with the scheduling by the base station 10 and performs self-calibration and monitoring.

Subsequently, at S306, the transmitting systems TX1 and TX2 of the terminal 20 perform UL transmissions. During the performing of the UL transmissions at S306, the transmission characteristics of the terminal 20 may be improved by the calibration. The base station 10 can perform reception while assuming that the characteristics of the UL transmissions from the terminal 20 are improved. Here, at S306, the reception systems RX1 and RX2 of the terminal 20 may additionally or alternatively perform DL receptions. In this case, during the performing of the DL receptions at S306, the reception characteristics of the terminal 20 may be improved by the calibration.

In the above-described embodiments, calibration may be to correct a deviation/precision of a measuring device by using reference values. For example, in the example of FIG. 4, calibration may mean that the terminal 20 corrects, in a Gap duration, output of a power amplifier of TX1 by using a reference value and output power of a power amplifier of TX2 by using a reference value. Furthermore, in the example of FIG. 5, the calibration may mean that the terminal 20 corrects output of the power amplifier of TX2 by using the reference value in the duration of GP1 and corrects output of the power amplifier of TX1 by using the reference value in the duration of GP2.

In the above-described embodiments, the method of calibration is not limited to the method performed by the terminal 20 within the terminal 20. For example, in the example illustrated in FIG. 5, the base station 10 may measure received power based on the UL transmission in GP1 by TX1 of the terminal 20, the base station 10 may feed back the value of the measured received power to the terminal 20, and the terminal 20 may perform calibration of the power of the power amplifier of TX1 based on the value of the received power that is fed back. Similarly, in the example illustrated in FIG. 5, the base station 10 may measure received power based on the UL transmission in GP2 by TX2 of the terminal 20, the base station 10 may feed back the value of the measured received power to the terminal 20, and the terminal 20 may perform calibration of the power of the power amplifier of TX2 based on the value of the received power that is fed back.

Note that, in the above-described embodiments, the object to be calibrated is not limited to the output of the power amplifier. For example, a timing of a clock inside the terminal 20 may be calibrated. Received power indicated by the reception system of the terminal 20 may be calibrated. A bandwidth of a Band Width Part (BWP) configured by the terminal 20 may be calibrated. Precision of synchronization by a synchronization circuit of the terminal 20 may be calibrated.

In the above-described embodiments, monitoring may mean that the terminal 20 measures transmission power (power leakage) of the terminal 20 in a UL gap in which the terminal 20 does not perform a UL transmission. Furthermore, monitoring may mean that the terminal 20 measures a level of out-of-band radiation by the terminal 20 in a UL gap in which the terminal 20 does not perform a UL transmission. Furthermore, monitoring may mean that the terminal 20 measures received power of the terminal 20 in a UL gap in which the terminal 20 does not perform a UL transmission.

For example, in the example of FIG. 4, monitoring may mean that the terminal 20 measures received power in the Gap duration. Furthermore, in the example of FIG. 5, monitoring may mean that the terminal 20 measures a received level in the duration of GP1 and measures a received level in the duration of GP2.

Note that, in the above-described embodiments, the object of monitoring by the terminal 20 is not limited to the received power. For example, the terminal 20 may monitor a timing of a clock inside the terminal 20. The terminal 20 may monitor transmission power of the transmission system of the terminal 20. The terminal 20 may monitor a bandwidth of a Band Width Part (BWP) configured by the terminal 20. The terminal 20 may monitor precision of synchronization by a synchronization circuit of the terminal 20.

In the above-described embodiments, monitoring is not limited to monitoring performed by the terminal 20. For example, by transmitting a signal indicating a timing of a clock inside the terminal 20 to the base station 10, the terminal 20 may cause the base station 10 to monitor the timing of the clock inside the terminal 20. By performing a UL transmission, the terminal 20 may cause the base station 10 to monitor transmission power of the transmission system of the terminal 20. By performing a UL transmission, the terminal 20 may cause the base station 10 to monitor a bandwidth of a BWP configured by the terminal 20. By transmitting a synchronization signal output from a synchronization circuit of the terminal 20 to the base station 10, the terminal 20 may cause the base station 10 to monitor precision of synchronization by the synchronization circuit of the terminal 20.

In the above-described embodiments, the UL gap may be a time domain radio resource in which one or more transmission systems of the one or more transmission systems of the terminal 20 stop uplink transmission. The UL gap may be a frequency domain radio resource in which one or more transmission systems of the one or more transmission systems of the terminal 20 stop uplink transmission. The UL gap may be a time and frequency domain radio resource in which one or more transmission systems of the one or more transmission systems of the terminal 20 stop uplink transmission. For example, the UL gap may be a periodic pattern in the time direction of the time and frequency domain radio resource in which one or more transmission systems of the one or more transmission systems of the terminal 20 stop uplink transmission. For example, the UL gap may be a periodic pattern in the frequency direction of the time and frequency domain radio resource in which one or more transmission systems of the one or more transmission systems of the terminal 20 stop uplink transmission. For example, the UL gap may be a two-dimensional periodic pattern in the frequency direction and the frequency direction of the time and frequency domain radio resource in which one or more transmission systems of the one or more transmission systems of the terminal 20 stop uplink transmission.

In the above-described embodiments, the length of the UL gap in the time direction may be specified by using a symbol, a slot, or a subframe, as a unit. Furthermore, the length of the UL gap in the frequency direction may be specified by using a resource block or a sub-channel, as a unit. A BWP of the UL gap may be specified. Furthermore, an antenna port for which the UL gap is configured may be specified. Furthermore, in the above-described embodiments, the gap is not limited to a gap related to a UL transmission. For example, the UL gap in the above-described embodiments may be replaced with a DL gap in which the terminal 20 does not perform a DL reception.

The above-described embodiments may be applied to a frequency band in the FR2, or a frequency band in an FR other than FR2, for example, in the FR1.

The above-described embodiments are not limited to the improvement of the Radio Frequency (RF) transmission condition in the Gap duration, and the above-described embodiments may be applied to improvement of another condition, such as an RF reception condition, a Radio Resource Management (RRM) condition, or a Demand condition.

The above-described embodiments may be applied to a radio device other than a generic user device (a UE to be installed in a car, a UE for Fixed Wireless Access (FWS), and a base station).

The signaling in the above-described embodiments (e.g., UE Capability or IE) may be implemented by signaling other than the signaling described in the embodiments (e.g., Downlink Control Information (DCI) or MAC CE).

The signaling in the above-described embodiments may be newly introduced, or the existing signaling may be applied.

From the solution A and the solution B in the above-described embodiments, both solution A and solution B may be implemented, or one of the solution A and the solution B may be implemented. Furthermore, a portion of the solution A may be partially implemented, or a portion of the solution B may be partially implemented.

(Device Configuration)

Next, an example of functional configurations of the base station 10 and the terminal 20 is described, which are for performing the process and the operation described above. The base station 10 and the terminal 20 include functions for implementing the above-described solution A and solution B. However, each of the base station 10 and the terminal 20 may only include a proposed function of the solution A or the solution B.

<Base Station 10>

Figure 8:
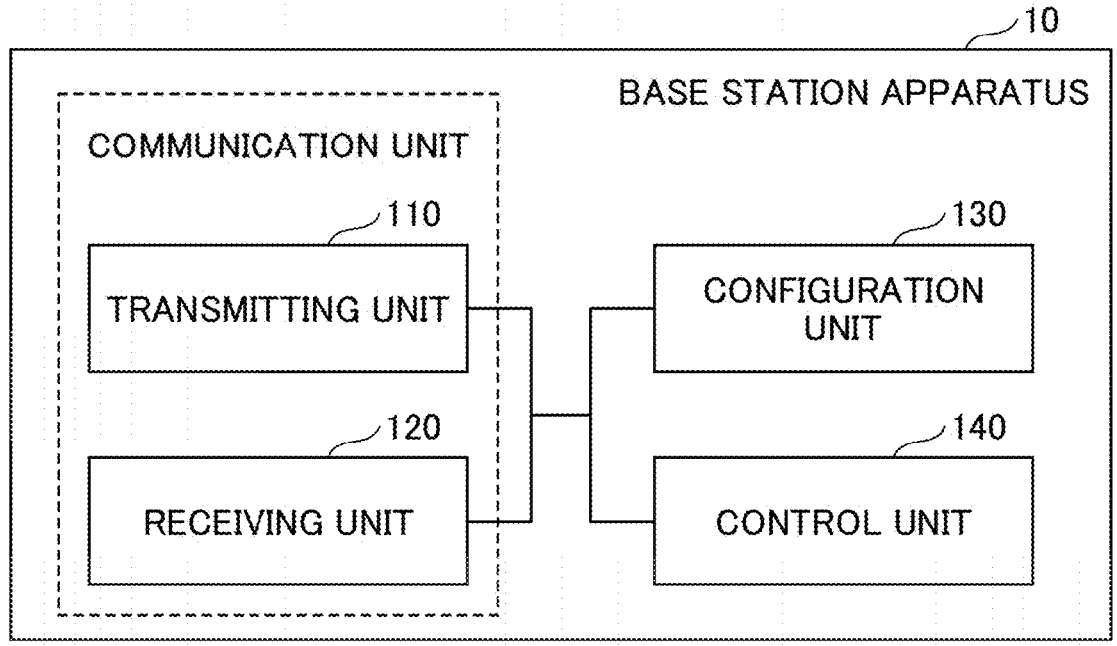
FIG. 8 is a diagram illustrating an example of a functional configuration of a base station 10 according to an embodiment of the present invention.

FIG. 8 is a diagram illustrating an example of a functional configuration of the base station 10. As illustrated in FIG. 8, the base station 10 includes a transmitting unit 110; a receiving unit 120; a configuration unit 130; and a control unit 140. The functional configuration illustrated in FIG. 8 is merely an example. The functional division and the names of the functional units may be any division and names, provided that the operation according to the embodiments of the present invention can be executed. The transmitting unit 110 and the receiving unit 120 may be referred to as a communication unit.

The transmitting unit 110 includes a function for generating a signal to be transmitted to the terminal 20 and transmitting the signal through radio. The receiving unit 120 includes a function for receiving various signals transmitted from the terminal 20 and retrieving, for example, information of a higher layer from the received signals. The transmitting unit 110 is provided with a function to transmit NR-PSS, NR-SSS, NR-PBCH, DL/UL control signals, DL data, and the like, to the terminal 20. Furthermore, the transmitting unit 110 transmits configuration information or the like described in Solution A.

The configuration unit 130 stores, in a storage device, preconfigured configuration information and various types of configuration information to be transmitted to the terminal 20, and reads out the information from the storage device, if necessary. The control unit 140 performs resource assignment, control of the entire base station 10, and the like. The functional unit related to signal transmission in the control unit 140 may be included in the transmitting unit 110, and the functional unit related to signal reception in the control unit 140 may be included in the receiving unit 120. Furthermore, the transmitting unit 110 may be referred to as a transmitter, and the receiving unit 120 may be referred to as a receiver.

<Terminal 20>

Figure 9:
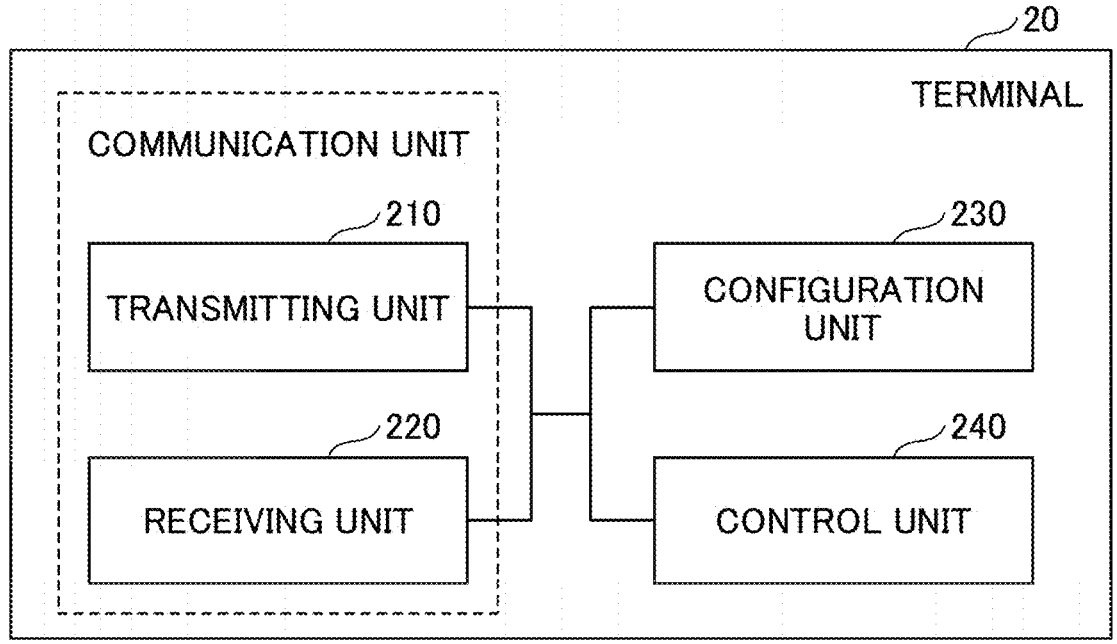
FIG. 9 is a diagram illustrating an example of a functional configuration of the terminal 20 according to an embodiment of the present invention.

FIG. 9 is a diagram illustrating an example of a functional configuration of the terminal 20. As illustrated in FIG. 9, the terminal 20 includes a transmitting unit 210; a receiving unit 220; a configuration unit 230; and a control unit 240. The functional configuration illustrated in FIG. 9 is merely an example. The functional division and the names of the functional units may be any division and names, provided that the operation according to the embodiments of the present invention can be executed. The transmitting unit 210 and the receiving unit 220 may be referred to as a communication unit.

The transmitting unit 210 creates a transmission signal from transmission data and transmits the transmission signal through radio. The receiving unit 220 receives various signals through radio and retrieves higher layer signals from the received physical layer signals. Furthermore, the transmitting unit 210 stops a UL transmission in a UL gap, and transmits HARQ-ACK, and the control unit 240 performs the calibration and/or monitoring described in the above embodiments.

The configuration unit 230 stores, in a storage device, various types of configuration information received by the receiving unit 220 from the base station 10, and reads out the information from the storage device, if necessary. Furthermore, the configuration unit 230 stores preconfigured configuration information. The control unit 240 performs control or the like of the entire terminal 20. A functional unit related to signal transmission in the control unit 240 may be included in the transmitting unit 210, and a functional unit related to signal reception in the control unit 240 may be included in the receiving unit 220. Furthermore, the transmitting unit 210 may be referred to as a transmitter, and the receiving unit 220 may be referred to as a receiver.

In the embodiments, at least, the terminal, the communication method, and the base station below are described.

(Item 1)

A terminal including
a receiving unit that receives configuration information for configuring a time and frequency domain in which a transmission is stopped;
a transmitting unit that transmits terminal capability information indicating that the terminal is capable of performing calibration by stopping the transmission in the time and frequency domain; and
a control unit that performs the calibration by stopping the transmission in the time and frequency domain based on the configuration in a case where the receiving unit receives the configuration information and the transmitting unit transmits the terminal capability information.

(Item 2)

The terminal as described in item 1, wherein the transmitting unit includes, in the terminal capability information, information indicating a transmission characteristic of the terminal for which the calibration is to be performed in the time and frequency domain and transmits the terminal capability information.

(Item 3)

The terminal as described in item 1, wherein the transmitting unit of the terminal is provided with a first transmitting unit and a second transmitting unit, and
wherein the configuration information includes information for independently configuring a first time and frequency domain in which the first transmitting unit stops transmitting and a second time and frequency domain in which the second transmitting unit stops transmitting.

(Item 4)

The terminal as described in item 1, wherein the transmitting unit includes, in the terminal capability information, a value of transmission power to be increased by the calibration, a value of a maximum transmission power reduction to be reduced by the calibration, a value of a bit error rate to be improved by the calibration, an amount of adjacent channel interference to be reduced by the calibration, and/or a level of undesirable in-band radiation to be reduced by the calibration, and the transmitting unit transmits the terminal capability information.

(Item 5)

A communication method executed by a terminal, the method including
receiving configuration information for configuring a time and frequency domain in which a transmission is stopped;

transmitting terminal capability information indicating that the terminal is capable of performing calibration by stopping the transmission in the time and frequency domain; and performing the calibration by stopping the transmission in the time and frequency domain based on the configuration in a case where the receiving receives the configuration information and the transmitting transmits the terminal capability information.

(Item 6)

A base station including a transmitting unit that transmits configuration information for configuring a time and frequency domain in which a terminal stops a transmission;

a receiving unit that receives terminal capability information indicating that the terminal is capable of performing calibration by stopping the transmission in the time and frequency domain; and a control unit that performs the calibration by stopping the transmission in the time and frequency domain based on the configuration in a case where the transmitting unit transmits the configuration information and the receiving unit receives the terminal capability information.

By the configuration described in any of the above-described items, the terminal can appropriately configure a UL gap for calibrating and/or monitoring transmission and/or reception characteristics.

(Hardware Configuration)

The block diagrams (FIG. 8 and FIG. 9) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 10:
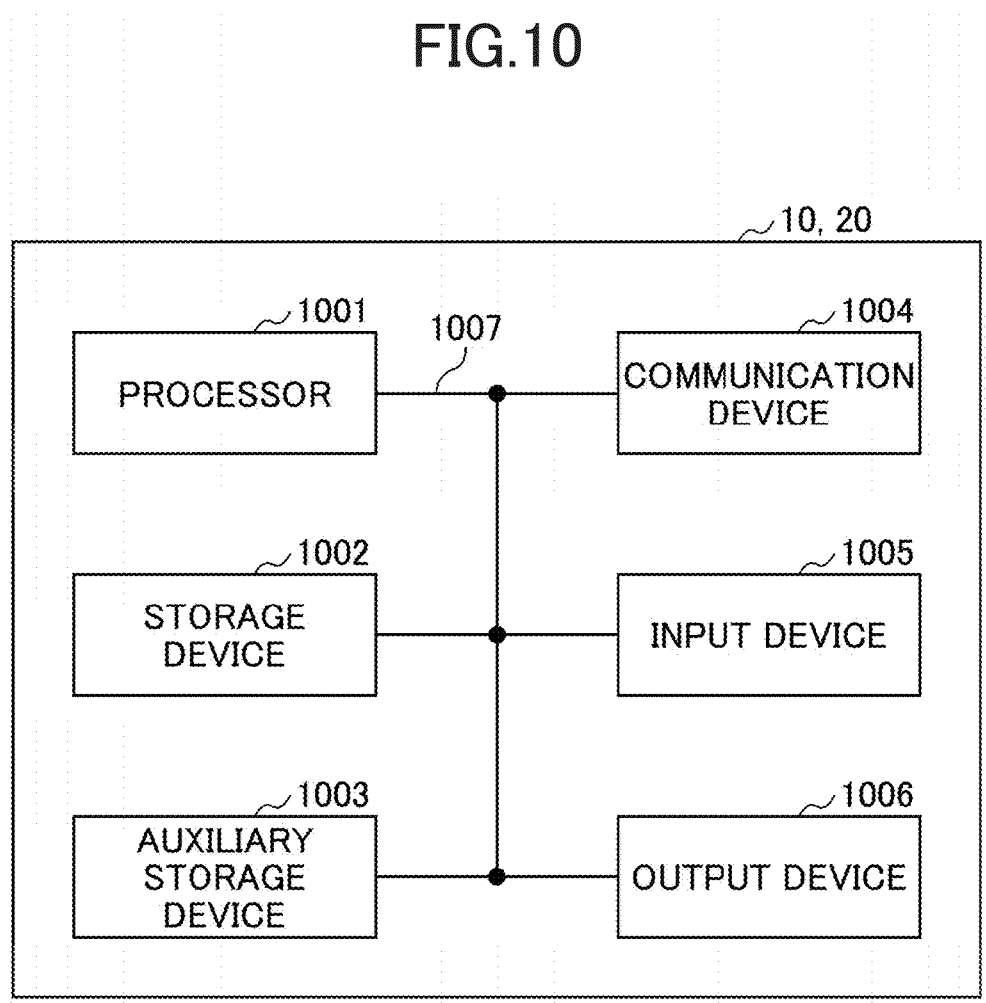
FIG. 10 is a diagram illustrating an example of a hardware configuration of the base station 10 or the terminal 20 according to an embodiment of the present invention.

For example, the base station 10, the terminal 20, or the like in an embodiment of the present disclosure may function as a computer for performing a process of the radio communication method according to the present disclosure. FIG. 10 is a diagram illustrating an example of a hardware configuration of the base station 10 and the terminal 20 according to an embodiment of the present disclosure. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, device, unit, or the like. The hardware configuration of each of the base station 10 and the terminal 20 may be configured to include each device depicted, or may be configured without including some devices.

Each function in each of the base station 10 and the terminal 20 is implemented such that predetermined software (program) is read on hardware, such as the processor 1001, the storage device 1002, and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a Central Processing Unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station 10 illustrated in FIG. 8 may be implemented by a control program which is stored in the storage device 1002 and operates on the processor 1001. Furthermore, for example, the control unit 240 of the terminal 20 illustrated in FIG. 9 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and may be configured with, for example, at least one of a Read Only Memory (ROM), an Erasable Programmable ROM (EPROM), an Electrically Erasable Programmable ROM (EEPROM), a Random Access Memory (RAM), and the like. The storage device 1002 may also be referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a Compact Disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described auxiliary storage device 1003 may be referred to as a secondary storage. The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as, for example, a "network device," a "network controller," a "network card," a "communication module," or the like. The communication device 1004 may be configured to include a high frequency switch, a duplexer, a filter, a frequency synthesizer, and the like to implement at least one of frequency division duplex (FDD: Frequency Division Duplex) and time division duplex (TDD: Time Division Duplex). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally formed (such as a touch panel).

The devices, such as the processor 1001 and the storage device 1002, are connected by the bus 1007 for communicating information. The bus 1007 may be configured with a single bus or may be configured with different buses between the devices.

Furthermore, each of the base station 10 and the terminal 20 may be configured to include hardware, such as a microprocessor, a digital signal processor (DSP: Digital Signal Processor), an Application Specific Integrated Circuit (ASIC), a Programmable Logic Device (PLD), or a Field Programmable Gate Array (FPGA), or all or some of the functional blocks may be implemented by the hardware. For example, the processor 1001 may be implemented by at least one of these hardware components.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by using any other method. For example, the notification of information may be provided by physical layer signalling (for example, Downlink Control Information (DCI) or Uplink Control Information (UCI)), higher layer signaling (for example, Radio Resource Control (RRC) signaling, Medium Access Control (MAC) signaling, broadcast information (Master Information Block (MIB), System Information Block (SIB)), other signals, or a combination thereof. Furthermore, the RRC signaling may be referred to as an RRC message and may be, for example, an RRC Connection Setup message, an RRC Connection Reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information, a signal, or the like described in the present disclosure may be output from a higher layer (or a lower layer) to a lower layer (or a higher layer). Information, a signal, or the like described in the present disclosure may be input and output via a plurality of network nodes.

Input and output information and the like may be stored in a specific place (for example, a memory) or may be managed by using a management table. Input and output information and the like may be overwritten, updated, or additionally written. Output information and the like may be deleted. Input information and the like may be transmitted to another device.

The determination in the present disclosure may be made in accordance with a value (0 or 1) indicated by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology is included in a definition of a transmission medium.

Information, signals, and the like described in the present disclosure may be expressed using any one of a variety of different techniques. For example, data, instructions, commands, information, signals, bits, symbols, chips, and the like which are mentioned throughout the above description may be expressed by voltages, currents, electromagnetic waves, magnetic fields or magnetic particles, optical fields or photons, or any combination thereof.

The terms described in the present disclosure and terms necessary for understanding the present disclosure may be replaced with terms having the same or similar meanings. For example, at least one of a channel and a symbol may be a signal (signalling). Furthermore, a signal may be a message. Furthermore, a component carrier (CC: Component Carrier) may be referred to as a "carrier frequency," a "cell," a "frequency carrier," or the like.

The terms "system" and "network" used in the present disclosure are used interchangeably.

Furthermore, information, parameters, and the like described in the present disclosure may be expressed by using absolute values, may be expressed by using relative values from predetermined values, or may be expressed by using any other corresponding information. For example, radio resources may be those indicated by an index.

The names used for the above-described parameters are not limited names in any point of view. Furthermore, mathematical formulas or the like using the parameters may be different from those explicitly disclosed in the present disclosure. Since various channels (for example, a PUSCH, a PUCCH, a PDCCH, and the like) and information elements can be identified by any suitable names, various names assigned to the various channels and the information elements are not limited names in any point of view.

In the present disclosure, the terms "base station (BS: Base Station)," "radio base station," "base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base station may also be referred to by a term, such as a macrocell, a small cell, a femtocell, and a picocell.

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS: Mobile Station)," "terminal (user terminal)," "terminal (UE: User Equipment)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device that need not move during a communication operation. For example, at least one of the base station and the mobile station may be an Internet of Things (IoT) device such as a sensor.

Furthermore, the base station in the present disclosure may be replaced with a terminal. For example, each aspect/ embodiment of the present disclosure may be applied to a configuration in which communication between the base station and the terminal is replaced with communication between a plurality of terminals 20 (for example, which may be referred to as Device-to-Device (D2D) or Vehicle-to-Everything (V2X)). In this case, the terminal 20 may have the functions of the base station 10 described above. Furthermore, the terms "uplink" and "downlink" may be replaced with terms (for example, "side") corresponding to inter-terminal communication. For example, an uplink channel, a downlink channel, or the like may be replaced with side channels.

Similarly, the terminal in the present disclosure may be replaced with the base station. In this case, the base station may have the functions of the above-described terminal.

The terms "determination(determining)" and "decision (determining)" used in the present specification may include various types of operations. The "determination" and "decision" may include deeming "judging," "calculating," "computing," "processing," "deriving," "investigating," "looking up (for example, searching in a table, a database, or another data structure)," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation, such as "first" or "second," used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Furthermore, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like.

The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology.

The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B.

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. One TTI, one subframe, or the like may be formed of one or more resource blocks.

Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like.

Furthermore, the resource block may be formed of one or more resource elements (RE: Resource Element). For example, one RE may be a radio resource region of one subcarrier and one symbol.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Furthermore, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Each aspect/embodiment described in the present disclosure may be used alone, in combination, or may be switched in accordance with the execution. Furthermore, notification of predetermined information (for example, notification of "being X") is not limited to notification performed explicitly, but may be performed implicitly (for example, not notifying the predetermined information).

In the present disclosure, an SS block or a CSI-RS is an example of a synchronization signal or a reference signal.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

REFERENCE SIGNS LIST 10 base station
110 transmitting unit
120 receiving unit
130 configuration unit
140 control unit
20 terminal
210 transmitting unit
220 receiving unit
230 configuration unit
240 control unit
1001 processor
1002 storage device
1003 auxiliary storage device
1004 communication device
1005 input device
1006 output device

The invention claimed is:

1. A terminal comprising:
a transmitter that transmits, to a base station, terminal capability information on a gap for an uplink transmission;
a receiver that receives, from the base station, configuration information on the gap for the uplink transmission; and
a controller that configures, based on the configuration information, a length and a period of a time interval for periodically stopping the uplink transmission, wherein the controller further configures a first condition for enhancement of transmit power for the uplink transmission outside the time interval, and a second condition for a maximum power reduction amount for the transmit power,
wherein the controller configures, as the first condition, a condition on a relative value of transmit power of the terminal enhanced by calibration with respect to the transmit power of the terminal prior to the enhancement, and the controller configures, as the second condition, a condition on an absolute value of the maximum power reduction amount.

2. The terminal according to claim 1, wherein the controller configures, as the second condition, the maximum power reduction amount to be less than or equal to 3 dB.

3. A base station comprising:
a receiver that receives, from a terminal, terminal capability information on a gap for an uplink transmission;
a transmitter that transmits, to the terminal, configuration information on the gap for the uplink transmission; and
a controller that assumes, based on the configuration information, a length and a period of a time interval for the terminal to periodically stop the uplink transmission, wherein the controller further configures a first condition for enhancement of transmit power for the uplink transmission by the terminal outside the time interval, and a second condition for a maximum power reduction amount for the transmit power,
wherein the controller configures, as the first condition, a condition on a relative value of transmit power of the terminal enhanced by calibration with respect to the transmit power of the terminal prior to the enhancement, and the controller configures, as the second condition, a condition on an absolute value of the maximum power reduction amount.

4. A communication system comprising:
a terminal; and
a base station,
wherein the terminal includes:
a transmitter that transmits, to the base station, terminal capability information on a gap for an uplink transmission;

a receiver that receives, from the base station, configuration information on the gap for the uplink transmission; and a controller that configures, based on the configuration information, a length and a period of a time interval for periodically stopping the uplink transmission, wherein the controller further configures a first condition for enhancement of transmit power for the uplink transmission outside the time interval, and a second condition for a maximum power reduction amount for the transmit power, wherein the controller configures, as the first condition, a condition on a relative value of transmit power of the terminal enhanced by calibration with respect to the transmit power of the terminal prior to the enhancement, and the controller configures, as the second condition, a condition on an absolute value of the maximum power reduction amount, and wherein the base station includes:

a receiver that receives, from the terminal, the terminal capability information;

a transmitter that transmits, to the terminal, the configuration information; and a controller that assumes, based on the configuration information, the length and the period of the time interval for the terminal to periodically stop the uplink transmission, wherein the controller further configures the first condition for the enhancement of the transmit power for the uplink transmission by the terminal outside the time interval, and the second condition for the maximum power reduction amount for the transmit power.

5. A communication method executed by a terminal, the method comprising:

transmitting, to a base station, terminal capability information on a gap for an uplink transmission;

receiving, from the base station, configuration information on the gap for the uplink transmission;

configuring, based on the configuration information, a length and a period of a time interval for periodically stopping the uplink transmission; and configuring a first condition for enhancement of transmit power for the uplink transmission outside the time interval, and a second condition for a maximum power reduction amount for the transmit power, wherein the terminal configures, as the first condition, a condition on a relative value of transmit power of the terminal enhanced by calibration with respect to the transmit power of the terminal prior to the enhancement, as the second condition, a condition on an absolute value of the maximum power reduction amount.

* * * * *